May 13, 1952     E. G. MERCIER     2,596,581
INTERMITTENT MOVEMENT
Filed April 25, 1951
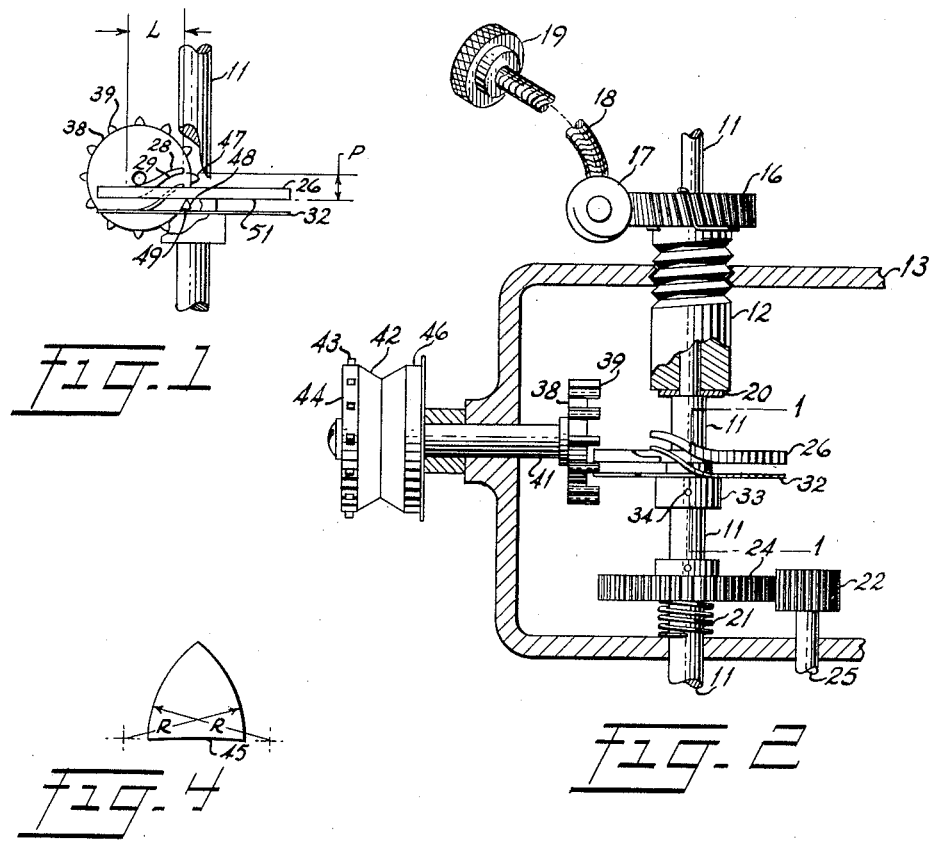
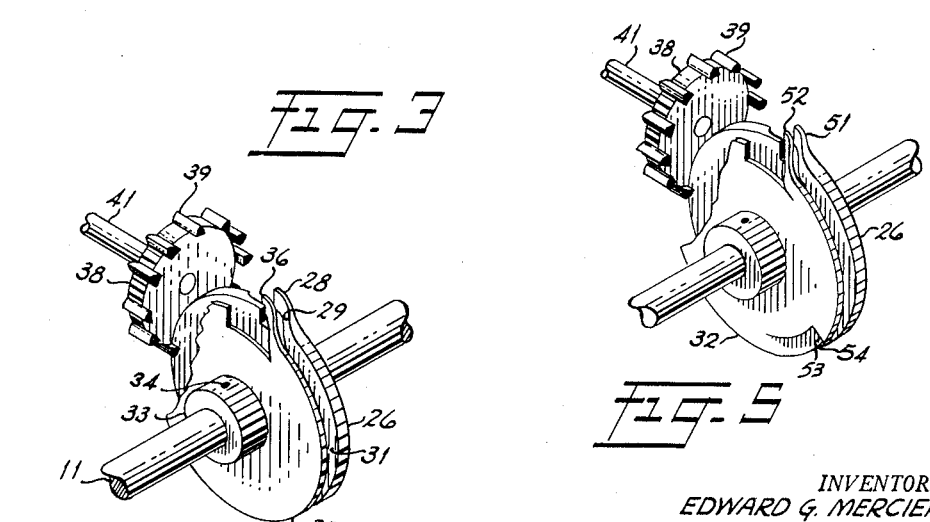
INVENTOR.
EDWARD G. MERCIER
BY
ATTORNEY Patented May 13, 1952

2,596,581

UNITED STATES PATENT OFFICE 2,596,581

INTERMITTENT MOVEMENT

Edward George Mercier, New York, N. Y., assignor to General Precision Laboratory Incorporated, a corporation of New York Application April 25, 1951, Serial No. 222,816

6 Claims. (Cl. 74—426)

This invention relates to an intermittent movement particularly adapted for use in motion picture projectors.

The conventional motion picture projector intermittently advances a film strip past a projection aperture, holding the film strip stationary during the times that a light beam is projected therethrough and at other times, when the light beam is cut off by a shutter, moving the film to bring the next succeeding frame into the projection area.

It is the function of the intermittent movement of the projector to convert the continuous uniform rotation of the driving mechanism to the intermittent actuation necessary to position the individual pictures or frames in the aperture. Since this action is quite rapid, being repeated 16 or 24 times per second, the intermittent movement must be of low inertia. Because the film picture is greatly enlarged on the screen, minute inaccuracies in the mechanism are magnified and the necessary accuracy of all parts of the operating mechanism including the intermittent movement must be in the order of tenths of thousandths of an inch to insure absence of jiggle and to preserve framing of the picture on the screen. Because of the great number of operations required of intermittent mechanism, it should be designed for low wear and it is especially desirable that any wear that does take place shall have no effect at all on the picture quality.

The type of intermittent movement that makes use of a cam and a toothed wheel of the pin wheel or pin gear type has particular advantages in permitting the use of a pulldown angle, i. e. rapidity of actuation, of any desired amount, and in permitting designed acceleration and deceleration of the film in accordance with any desired law. The instant invention provides this type of intermittent movement, which is here termed the cam and pin gear type.

This type of intermittent movement is of particular use in 16 mm. and 8 mm. projectors because in these sizes the small moving parts have satisfactorily low inertia while permitting exploitation of the above advantages. The intermittent movement of the present invention can also be employed in 35 mm. and other projectors, although the mechanism is larger when designed for larger film sizes. Also the invention can be applied to motion picture cameras of all sizes. The invention is particularly adapted for use in producing intermittent motion of a systematically irregular nature, such as that required in projectors used for televising motion picture film, in which the successive exposure times are in the ratio of 2 to 3.

The intermittent movement of the instant invention can be advantageously employed in place of the usual claw movement in 16 mm. projectors to conserve film life. Because the cam and pin gear movement can be enclosed and operated in oil it is quieter and longer lived than the claw movement and, because its period of pulldown can be made very short, the movement is especially adapted for use in certain types of television recording apparatus requiring fast pulldown. The instant intermittent movement is peculiarly adapted for continuous use in applications demanding high quality, because its novel design is such as to compensate automatically for pin wear so that there can be no deterioration of quality due to such wear.

It is one of the purposes of the present invention, therefore, to provide an improved intermittent movement of the cam and pin gear type.

It is another purpose of the present invention to provide a motion picture projector intermittent movement which is simple and economical to manufacture and which at the same time accurately positions the individual frames of the picture strip in correct relation to the projection aperture to produce thereby a steady picture on the projection screen.

It is still another purpose of the present invention to provide a motion picture intermittent movement that is capable of employing the optimum type of film acceleration, and that does not deteriorate in accuracy of operation due to wear of the pins of the pin gear.

A further understanding of the invention may be secured from the detailed description together with the drawings, in which:

Figure 1 represents a view of the intermittent movement, partly cross-sectioned on line 1—1 of Fig. 2.

Figure 2 represents a side view of the intermittent movement of Fig. 1.

Figure 3 is an isometric view of the cam, pin gear and flexible disc, partly cut away to show the tooth which is in contact with the cam.

Figure 4 illustrates one preferred form of pin gear tooth cross section.

Figure 5 illustrates a cam and pin gear for providing a 2 to 3 ratio of film advance.

Referring particularly to Figs. 1 and 2, a shaft 11 is journalled in a bushing 12 and also in the housing 13. The bushing 12 is in turn threaded into another portion of the housing and carries a spur gear 16 secured to one end. The spur gear 16 is meshed with a worm 17 connected by means of a flexible shaft 18 to an adjusting knob 19. A compression spring 21 is fitted around the shaft 11 adjacent the frame 13 and is confined between a gear 24 and the wall of the housing 13, so that the shaft 11 is urged toward the bushing 12. The shaft 11 is shouldered where it enters the bushing 12, so that the shaft 11 bears against the end of the bushing, the thrust of the spring 21 being taken by a washer 20. The shaft 11 is fitted with the spur gear 24 secured thereto and adapted to be driven by any source of mechanical power through the gear 22 attached to a shaft 25, the rate of rotation being equal to the rate of picture projection. For instance, if the picture projection rate is 24 per second, the required rate of rotation of the shaft 11 is 24 revolutions per second.

A cam 26 is pressed or otherwise securely and rigidly fastened onto the shaft 11 so that it is positioned against a shoulder 27 formed in the shaft. This cam is most easily constructed from a disc by cutting a circumferential tongue therein and accurately bending the tongue to a selected reverse curvature. The described form is better seen in Fig. 3, in which the bent tongue 28 is clearly visible. The operating cam surface comprises a path in the surface 29 of the tongue 28 and a circular path in the surface 31 of the disc. Since the cam follower remains at all times at a constant radius but moves axially in the camming process the action is similar to that produced by a cam track on the surface of a right circular cylinder.

The exact proportions of this cam depend upon the interrelation between it and cooperating parts and can therefore be more easily understood in connection with later descriptions of those parts.

A relatively thin spring washer 32 is fastened to a hub 33 which has a center bore slidingly fitting the shaft 11. A set screw 34 is provided to secure the hub and spring washer in position. The spring washer 32 has a tongue 36 with a surface shape which conforms generally but not necessarily accurately to the shape of the surface 29 of the tongue 28 of the cam 26. The spring washer 32 functions only to maintain a light spring pressure on the pin gear tooth which at any instant of time is positioned between the spring washer and the cam surface 29, 31 of the cam disc 26. Thus a particular pin gear tooth is at all times resiliently held against the operating cam surface of the cam and only this single surface need be accurately ground. The spring washer 32 may be cheaply made by stamping and no great accuracy of surface conformation is required since variations in its surface are taken up in its resiliency and it is only the operating surface of the cam disc 26 which acts to accurately position the engaging pin tooth and hence the film strip.

A pin gear or wheel 38 is provided with twelve pins or teeth as, for example, the pin 39, all twelve being identical in shape and size and positioned exactly equidistantly and circularly around the pin gear 38. Exactness is here important as any variation in the effective angular position of any pin from its selected equidistant arrangement will produce an unsteadiness in the projected picture.

The pin gear 38 is positioned in a plane perpendicular to the plane of the cam 26, and in proximity to the cam so that as the cam 26 is rotated the offset portion 28 thereof engages successively the teeth 39 of the pin gear 38, each successive tooth as it is engaged by the cam serving as the cam follower thereof.

The pin gear 38 is secured to a shaft 41, Fig. 2, which carries a film sprocket wheel or roller 42 at its other end, a 16 mm. film sprocket wheel being chosen for illustration. This sprocket wheel provides 90° film wrap-around with drive by three or four teeth at all times, and accordingly is provided with a total of 12 sprocket teeth 43. These sprocket teeth are conventionally carried by a flange 44 for support of the perforated edge of the film, a second flange 46 being provided for the support of the outer edge of the film.

In operation the gear 24 and shaft 11 are rotated at a rate of 24 revolutions per second by any suitable motive means thus rotating the attached cam 26 and spring washer 32 at the same rate. At an instant just before the cam 26 engages the pin gear 38, the opening between the curved portions of the cam and spring washer moves toward the right as seen in Fig. 1. The tooth 47 is embraced by the opening and a linear element of the tooth perpendicular to the paper and longitudinal of the tooth touches the operative surface 29 of the cam tangentially to its curvature. As the cam continues toward the right its downwardly concave surface forces the tooth 47 downward as illustrated in the drawing, rotating the pin gear clockwise as viewed. The velocity of the pin is constantly increased, its acceleration being constant, until a point on the cam curve is reached where the velocity is maximum. During this time energy has been imparted to the pin gear through the cam from the motor, and the reaction against the cam is due to the inertia of the pin gear and associated parts and of the film, and the friction of the film in the gate. After the point of maximum velocity has been reached, approximately at the inflection point of the curved cam surface, the cam continues rightward controlling the constant deceleration and constantly decreasing velocity of the cam. The energy flow may be in either direction or may be zero, the cam surface acting as a guide. The spring washer resiliently holds the pin gear tooth against the cam surface while the pin gear and sprocket wheel inertia tend to cause the tooth to leave the cam surface. At the termination of the curved portion of the cam surface the tooth designated in Fig. 1 by the reference numeral 47 has been advanced to the position designated by the reference numeral 48 and a linear element of the tooth surface lies in the plane of the operative plane surface of the "dwell" portion of the cam. The pin gear has by this time advanced $\frac{1}{12}$ revolution and has caused the sprocket wheel 42 to advance through the same angle, so that the 16 mm. film will have been advanced by one sprocket hole and one frame. During the dwell period the pin gear tooth slides on the plane portion of the cam, held against the cam by the resilience of the spring washer, and the pin gear, sprocket wheel, and film are quiescent.

To adjust the film framing the knob 19 is rotated, which can be done while the mechanism is operating. This action rotates the bushing 12 through the worm 17 and gear 16, moving the shaft together with its cam and spring washer in one or the other axial direction. This changes the phase of operation of the pin gear in relation to the plane of the cam, which in turn changes the film framing a corresponding amount.

Since 16 mm. film has one sprocket hole per frame, it is necessary to advance the film by the distance between two adjacent sprocket holes each time that it is advanced by the intermittent movement. This therefore requires in the example that the film sprocket wheel 42 be advanced by $\frac{1}{12}$ revolution or 30° at each operation of the mechanism. For this reason the pin gear 38 is constructed with a like number of teeth, 12, so that its advancement by one tooth will advance the sprocket wheel 42 by one sprocket tooth and accordingly will advance the 16 mm. film strip by one frame. In the case of 8 mm. film which also has one sprocket hole per frame a like relation exists.

35 mm. film has 4 sprocket holes per frame and therefore a pin gear for use with such film must have a number of pins equal to one-fourth of the number of sprocket teeth on the associated film sprocket wheel, so that advancement of the pin gear by one tooth will advance the sprocket wheel by four sprocket teeth, thus advancing the 35 mm. film by one frame. In general, therefore, it may be stated that with any film the pin gear 38 must have a number of equally spaced teeth or pins equal to the number of sprocket teeth on the sprocket wheel 42 divided by the number of sprocket holes per frame carried by the film. An exception to this rule would obviously be the case in which the sprocket wheel 42 and the pin gear 38 are geared together instead of being direct connected, but the necessary relation has been made sufficiently obvious.

The effective diameter D, Fig. 2, of the pin gear 38 can be whatever is desired, employing the number of teeth or pins that are required as has been explained, so long as the associated cam 26 is constructed in a manner to cooperate properly with the pin gear. Ordinarily, however, the size of the pin gear 38 is kept as small as possible with due regard to convenience and attainable accuracy in machining small parts, and with regard to the requirements of strength and wear of the teeth. The advantage of keeping the pin gear diameter small is to keep its moment of inertia low, resulting in quieter operation and less wear.

The teeth or pins of the pin gear are all alike and each has an approximately truncated elliptical cross section which is conveniently made by hobbing each side of each tooth to a circular contour, as illustrated in Fig. 4. This cross-sectional form has the great advantage of permitting easy introduction of the tooth in the space between the spring washer 32, and the operating surface of the cam 26. In order to accomplish this result it is desirable to place the plane of the cam as shown in Fig. 1 below the center of the pin gear. Then each tooth as it enters the jaw formed by the cam and the spring washer will present its narrowest dimension to the jaw. As the cam turns, forcing the pin to slide along the accelerating portion of the cam curve, the pin is rotated by the turning of the pin gear to keep its smallest dimension approximately perpendicular to the surfaces of both the cam and the spring washer. At the inflection of the cam curve the rotating motion of the pin begins to present a larger and larger dimension to the space between the cam and the spring washer, tending to bring upon itself the resilient pressure of the spring washer. This pressure is, during the deceleration part of the cam curve, necessary to prevent the inertia of the pin cam and sprocket wheel causing the pin to leave the cam surface.

Control of the amount of resilient pressure increase is effected by cutting off some or all of the lower half of each tooth as, for instance, at the line 45 in Fig. 4, so that the 12 teeth as seen in place in the pin gear are truncated at their ends nearer the pin gear axis. The presentation of the larger dimension by the pin to the cam is maintained during the dwell period so that spring washer pressure is maintained during this period. An obvious alternative method of operation is to widen the space between the cam and the spring washer in the accelerating zone only, and to employ a tooth form that will maintain a constant dimension at all times in the direction normal to the cam surface. Such a tooth form is that of a right circular cylinder.

The cam 26 is so designed that the dimension P, Fig. 1 of the opening of its offset portion or tongue 28 is exactly equal to the linear distance or chord between operative surfaces of any two successive teeth of the pin gear. Each pin gear tooth has but one operative surface as the term is here used, that surface being the one that makes contact with the cam 26. For instance, in Fig. 1 the pin gear 38 is shown with one tooth 48 in contact at its upper or operative surface 49 with the plane operating cam surface 51. The tooth 47 is about to make contact by its upper or operative surface 52 with the curved operating cam surface 29.

The circumferential length L of the curved portion of the operative cam surface 29, measured in degrees of the cam 26 circumference, is the pulldown angle. It can be made as small or as large as desired with the restriction that the pin gear teeth which act successively as cam followers shall slide without binding. This limits the steepness of the cam slope in accordance with well-known principles of cam design. Within this limitation, however, employing a cam of reasonably small diameter, a pulldown angle as small as 50° can readily be secured. It is obvious, however, that there is no basic limitation upon the maximum diameter of the cam, and that when the diameter is enlarged, maintaining the maximum slope of cam and the diameter of the pin gear constant, the pulldown angle is thereby decreased. Therefore the angle of pulldown can be decreased to any desired degree without employing an unduly steep cam by designing a sufficiently large-diameter cam.

The curved cam surface 29 is depicted in the form of a reversed curve. Uniform acceleration produces the lowest maximum strain on the film and therefore is suitable for producing the shortest acceleration period for the reason that since the force or stress exerted on the film is directly proportional to the acceleration, and since strain is proportional to stress, the strain on the film sprocket holes rises instantly at the beginning of pulldown to the designed permissible value and maintains this value to the end of the acceleration period. Obviously any reduction of this value of acceleration for any part of the period must result in momentarily lower pulldown force and a correspondingly lengthened period, while any increase in the value of acceleration, even momentary during a part of the period, is not allowable because it would cause a strain on the film higher than permitted.

By similar reasoning it is obvious that the deceleration of the film must be uniform for best results. The optimum value of film deceleration force should be made exactly equal to the film gate friction drag and maintained at that uniform value during deceleration. There will then be zero stress on the film during the deceleration period. If the deceleration is less than the friction force, assumed constant, the deceleration will take longer; if deceleration is greater than the opposing friction force, the film will overshoot and tend to cause a film loop between the gate and the intermittent movement due to the film inertia, resulting in an unsteady picture.

The intermittent movement of a projector or camera must be capable of operation without film. However, it is obvious that the pin gear and connected sprocket wheel of this invention will, because of inertia, tend to continue rotation during the deceleration portion of the film-advance period in the absence of film. It is a function of the spring washer 32 to prevent this overshoot of the pin gear during the deceleration or later portion of the film advance period. At this time the spring washer 32 maintains sufficient spring pressure upon the side of the incident tooth opposite to its operative side to keep its operative side in continuous line contact with the operating surface of the curved cam.

The spring washer also functions while the tooth is on the flat portion of the cam to hold the tooth in firm contact with the single accurately finished cam surface, preventing jiggle of the film due to fortuitous vibration and preventing creep of the picture out of frame during this dwell period.

Finally the spring or resilient washer 32 functions as a means for automatically compensating for wear of the accurately finished cam surface and wear of the teeth 39. As is well known an intermittent movement must have a high degree of accuracy as respects the machinery of its positioning elements so that the successive film frames are always advanced to exactly the same position within a high degree of tolerance and maintained in that position until the next frame is moved into position before the projection aperture. Such accuracy is accomplished in the construction of new parts by careful precise machining and grinding operations and, of course, the greater the number of surfaces which must be finished to such accuracy the greater the resultant cost of the mechanism.

In the device of the instant invention this required accuracy is limited to the single surface on the cam 26 and the accurate equal spacing of the pins or teeth 39 around the circumference of the pin gear 33. The exact thickness of the pins 39 is not important since slight variations therein are taken up through the resiliency of the spring washer 32. Thus in the first instance the mechanism of the invention is cheaper to manufacture.

The maintenance of accuracy during the operative life of the parts is, however, of much greater importance and heretofore has been most difficult of achievement. In operation of such devices both the cam surfaces and the teeth are subject to wear and if as has heretofore been proposed the pins or teeth are operated in a groove machined in a solid drum cam it is found that in a very short time the teeth and sides of the groove wear to such an extent that the teeth fit only loosely in the groove allowing relative movement between the pin gear and cam and hence inaccurate placement of the film strips and oscillation or "jitter" which is very distressing to the viewer.

In the instant device, however, wear on the single cam surface of the cam and wear on the teeth is taken up by the resilience of the spring washer 32 and regardless of the amount of wear one surface of each tooth is always pressed against the cam surface without permitting play or backlash so that looseness of the interfitting of the parts with its concomitant loss of accuracy never develops.

It is of course not necessary to restrict the design of the cam to that producing one intermittent advance per cam revolution. As many camming tongues can be employed as desired, with appropriate enlargement of the cam diameter. It also is possible to place the camming tongues unsymmetrically around the cam so that with constant speed of rotation repeated asymmetrical cycles of pin gear intermittent operation are caused. The cam of Fig. 5 is an example of a multitongue cam designed for the before-mentioned purpose of televising a motion picture film, in which repeated cycles of dwell having the ratio of 2 to 3 are produced.

In this form of the invention the cam disc 26 is formed with two offset portions 51 and 53 separated by an angle of 144° so that successive film frames are held stationary for periods corresponding to 144° and 216° of revolution of the cam 26. Thus there is provided the required unequal periods of film dwell in the ratio of 2 to 3 ordinarily required for conversion of standard motion picture frame rate of 24 per second to the standard television rate of 30 frames each consisting of two television interlaced fields. In such a structure the spring washer 32 is of course, provided with similar struck-up portions 52 and 54.

What is claimed is:

1. An intermittent movement comprising, a cam disc having at least one cam surface lying in a plane normal to its axis and at least one curvate cam surface extending out of and longitudinally spaced with respect to said first mentioned cam surface, a pin gear having pins equally spaced about the periphery thereof, the distance between adjacent pins being equal to the maximum longitudinal displacement between said curvate cam surface and said first mentioned normal surface, said pin gear being positioned with its axis normal to the axis of said cam disc and having one face of a selected pin in engagement with one of the cam surfaces of said cam disc, a thin resilient disc member having a surface conformation similar to the cam surfaces of said cam disc positioned adjacent said cam surfaces but spaced therefrom by a distance less than the thickness of a pin whereby said selected pin is resiliently urged into engagement with said cam surfaces, and means for rotating said cam disc at a constant rate.

2. An intermittent movement as defined in claim 1 wherein said pins are generally truncated ellipses in cross section.

3. An intermittent movement as defined in claim 1 wherein said cam disc is provided with two curvate cam surfaces angularly spaced with respect to each other.

4. An intermittent movement comprising, a continuously rotating shaft, a cam disc, affixed thereto and rotated thereby having at least one cam surface lying in a plane normal to the axis of said shaft at least one curvate cam surface having one extremity spaced from said first mentioned cam surface and its other extremity merging therein, a thin resilient disc member having a surface configuration similar to the cam surfaces of said cam disc affixed to said shaft and longitudinally spaced from the cam surfaces of said cam disc, a pin gear having pins equally spaced about the periphery thereof, the distance between adjacent pins being equal to the maximum longitudinal spacing of the cam surfaces of said cam disc, said pin gear being disposed with its axis normal to the axis of said shaft and having a selected pin engaged in the space between said cam surfaces and said resilient disc member, the maximum thickness of said pins being greater than the distance separating said cam surfaces and said resilient disc member.

5. An intermittent movement as defined in claim 4 wherein said pins are generally truncated ellipses in cross section.

6. An intermittent movement as defined in claim 4 wherein said cam disc is provided with two curvate cam surfaces angularly spaced with respect to each other.

EDWARD GEORGE MERCIER.

REFERENCES CITED

The following references are of record in the file of this patent:

UNITED STATES PATENTS

| Number | Name | Date |
| --- | --- | --- |
| 1,016,545 | Bultman | Feb. 6, 1912 |
| 1,214,786 | Hill | Feb. 6, 1917 |
| 1,434,805 | Bodiker | Nov. 7, 1922 |
| 2,559,509 | Mercier et al. | July 3, 1951 |

FOREIGN PATENTS

| Number | Country | Date |
| --- | --- | --- |
| 93,221 | Austria | Jan. 15, 1923 |